United States Patent [19]
Levi

[11] 3,788,799
[45] Jan. 29, 1974

[54] BAKERY OVEN
[75] Inventor: George A. Levi, Saginaw, Mich.
[73] Assignee: Baker Perkins Inc., Saginaw, Mich.
[22] Filed: Jan. 21, 1971
[21] Appl. No.: 108,444

[52] U.S. Cl............. 432/143, 99/443, 34/201, 198/201
[51] Int. Cl............ A21c 1/44, A21b 3/00
[58] Field of Search .. 107/57 R; 198/201, 193, 191; 99/90 R, 90 CB, 443 C; 34/201; 432/121, 143; 126/19

[56] References Cited
UNITED STATES PATENTS

| 3,374,751 | 3/1968 | Werner | 107/57 R |
| 344,563 | 6/1886 | Channell | 198/201 |
| 1,100,654 | 6/1914 | Church | 198/201 |
| 3,129,806 | 4/1964 | Stiltner | 198/193 |
| 3,131,652 | 5/1964 | Johnston et al | 198/201 |

FOREIGN PATENTS OR APPLICATIONS

| 632,352 | 11/1949 | Great Britain |

OTHER PUBLICATIONS

Dura–Belting Co., Inc., 715 Heinz Ave. Berkeley 10, Calif., Cover and pages 2 and 3.

Primary Examiner—James R. Boler
Attorney, Agent, or Firm—Learman & McCulloch

[57] ABSTRACT

Baking of farinaceous products such as bread and cake by means of an endless band conveyor, at least one run of which passes through an oven, the conveyor band having secured thereto spaced apart, parallel, upstanding rails which, together with the conveyor band, form at least one dough-receiving trough extending longitudinally of the conveyor. The rails are formed of a resilient material capable of being stretched and also withstanding the oven heat without loss of resiliency.

1 Claim, 5 Drawing Figures

PATENTED JAN 29 1974
3,788,799
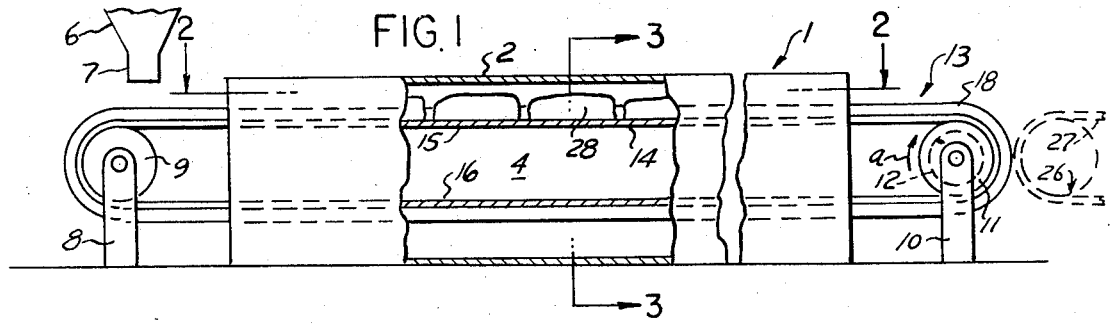
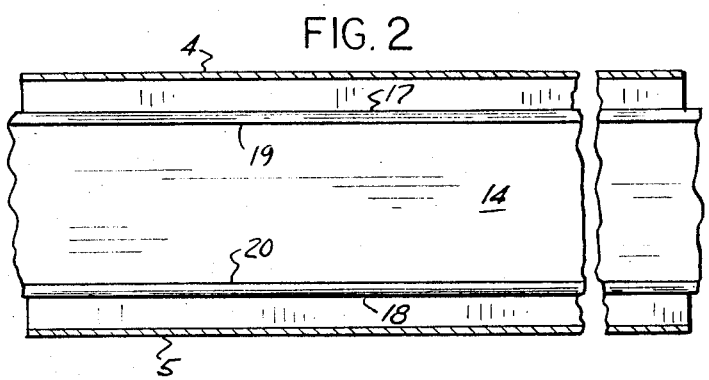
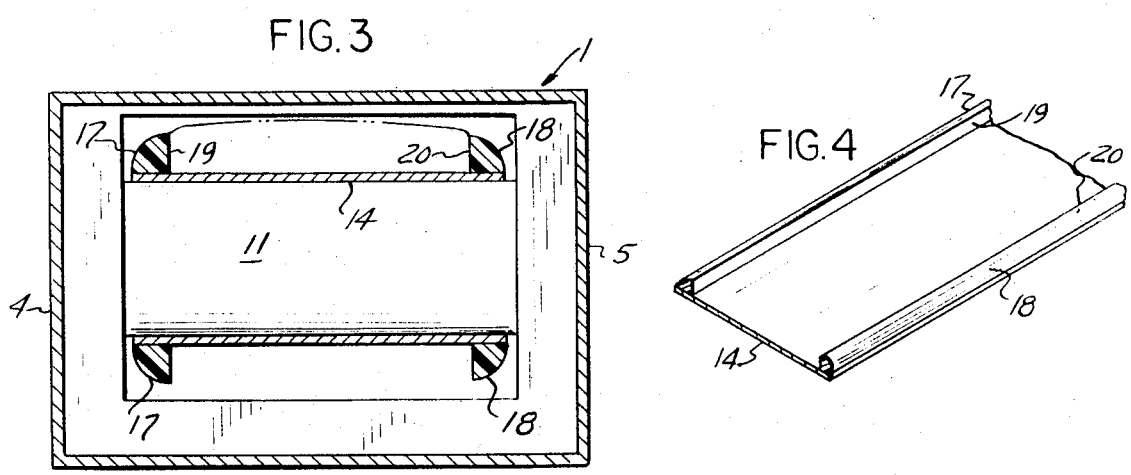
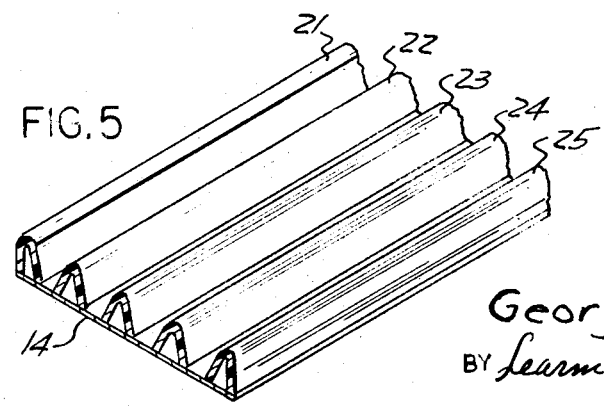
INVENTOR
George A. Levi
BY Learman & McCulloch
ATTORNEYS

BAKERY OVEN

FIELD OF THE INVENTION

The invention disclosed herein relates to methods and apparatus for baking farinaceous products and more particularly to the baking of such products in a so-called band oven wherein dough is deposited on the upper run of an endless conveyor which passes through an oven.

BACKGROUND OF THE INVENTION

Band ovens for the continuous baking of farinaceous products have been proposed heretofore, but not all of them have been altogether satisfactory for a number of reasons. For example, dough of the kind used with such ovens frequently is somewhat flowable, resulting in the necessity of providing some means for preventing undesirable spreading of the dough over and off the surface of the conveyor. Undesirable dough flow has been prevented heretofore by the utilization of individual pans for the accommodation of the dough, but the use of pans requires a relatively expensive link-type conveyor and necessitates the provision of means for depanning the baked products. It also has been proposed to solve the problem created by the flowable character of dough by the utilization of a flexible conveyor band having means for turning the side edges of the band upwardly to form a trough. The use of a flexible band, however, presents other problems such as the necessity of providing means for supporting the band during its passage through the oven, as well as the necessity of providing means for turning the edges upwardly and maintaining them turned throughout the time that the dough can flow. Moreover, a flexible band of the kind referred to is incapable of providing more than one trough.

An object of this invention is to provide apparatus and methods for the continuous baking of farinaceous products in band ovens and which overcome the disadvantages of previously known apparatus and methods for similar purposes and, avoids the use of pans.

Another object of this invention is to provide band oven baking apparatus having an endless conveyor provided with endless means for preventing undesirable dough flow.

A further object of the invention is to provide apparatus of the character referred to and in which the conveyor may be provided with a plurality of dough-receiving troughs.

Another object of the invention is to provide apparatus of the kind described having upstanding trough-forming rails formed of resilient material which can be stretched.

A further object of the invention is to provide an improved, continuous farinaceous baking process in which labor costs and capital expenditures are greatly reduced.

Other objects and advantages of the invention will be pointed out specifically or will become apparent from the following description when it is considered in conjunction with the appended claims and the accompanying drawings, in which:

FIG. 1 is a fragmentary, side elevational view of apparatus constructed in accordance with the invention, certain parts being broken away for clarity of illustration;

FIG. 2 is a sectional view taken on the line 2—2 of FIG. 1;

FIG. 3 is an enlarged sectional view taken on the line 3—3 of FIG. 1;

FIG. 4 is a fragmentary, isometric view of a portion of a conveyor constructed according to one embodiment of the invention; and FIG. 5 is a view similar to FIG. 4, but illustrating a conveyor portion formed according to another embodiment of the invention.

Apparatus constructed according to the invention is adapted for use in conjunction with a band-type oven 1 of conventional construction having top and bottom walls 2 and 3, respectively, and side walls 4 and 5. Conventional burner means (not shown) is provided for maintaining the interior of the oven 1 at suitable baking temperatures. The tunnel oven may be of the type disclosed in U.S. Pat. No. 3,173,384, granted Mar. 16, 1965 and incorporated herein by reference. Supported in any suitable manner adjacent the inlet end of the oven 1 is a hopper 6 having at its lower end a discharge spout 7 through which dough may be discharged.

Adjacent the inlet end of the oven 1 is mounted support means 8 on which is journaled a turning roll 9. Adjacent the opposite or discharge end of the oven is mounted a similar support means 10 on which is journaled a similar turning roll 11. The roll 11 may be coupled to a motor 12 which drives the roll 11 continuously in the direction $a$.

Spanning the distance between the turning rolls 9 and 11, and passing through the oven 1, is an endless conveyor 13 which preferably comprises a flat, flexible, endless band 14 formed of a strong material such as stainless steel. The conveyor band 14 thus forms upper and lower parallel runs 15 and 16, respectively, and, although both runs are disclosed as being within the oven 1, it is necessary that the upper run 15 only pass through the oven.

The conveyor 13 also includes at least one pair of parallel, spaced apart, endless, upstanding rails 17 and 18 which, together with the band 14, form an endless trough for the accommodation of dough. The rails 17 and 18 are so oriented with respect to the band 14 that the rails on the upper run 15 of the conveyor extend above the upper surface of the band 14 to provide an endless trough for the accommodation of dough.

The rails 17 and 18 must be formed of an acceptable food grade material which is capable of withstanding elevated baking temperatures, such as 500° F., and which is sufficiently resilient to withstand the flexing to which the rails are subjected as they pass around the turning drum rolls 9 and 11. A suitable material is "Silastic" silicone rubber, manufactured by Dow Corning Corp., Midland, Michigan, and designated No. 1125U by the manufacturer. This material has been approved by the Food and Drug Administration for use in connection with foods and is capable of withstanding temperatures up to 700° F. without adverse effects.

In the embodiment shown in FIGS. 1–4, the rails 17 and 18 are solid and have confronting walls 19 and 20, respectively, parallel to one another and normal to the band 14. The rails 17 and 18 are adhesively bonded to opposite edges of the band 14. The adhesive bond between the rails and the conveyor band must be leakproof for the full extent of the rails so as to prevent fluids from collecting between the rails and the conveyor band and causing contamination of the bakery products. The bond also must be capable of withstanding the flexing of the rails as they pass around the turning rolls 9 and 11 and, in addition, must be impervious to elevated baking temperatures. One suitable material having all of these characteristics is "Silastic" silicone adhesive No. 140 RTZ, manufactured by the aforementioned Dow Corning Corp.

The embodiment disclosed in FIG. 5 is similar to the previously described embodiment but differs from the latter in that the conveyor band 4 has bonded thereto a plurality of spaced apart, endless, parallel rails 21, 22, 23, 24 and 25 of the kind earlier described so as to provide a plurality of parallel, dough-accommodating troughs. As disclosed, the resilient rails 21–25 are hollow, V-shaped members. By forming the rails in such manner that their confronting surfaces diverge upwardly, as shown in FIG. 5, the baked products will have a truncated, wedge-shaped configuration.

It is preferred that the discharge end of the conveyor run 15 be mounted adjacent one end of a receiving conveyor 26 having an upper run 27 which is adjacent the terminal end of the upper run 15. A stripping knife 28 and deadplate 29 are provided between the upper run 15 and run 27, the knife 28 being urged to engage the run 15 by suitable springs (not shown) and serving to separate the strip product from the run 15.

In the operation of the apparatus in the continuous baking of farinaceous products, the motor 12 drives the conveyor 13 continuously so that the upper run 15 moves from left to right, as viewed in FIGS. 1 and 2. Adjacent the inlet end of the oven 1, dough in a flowable form is continuously discharged from the hopper 6 via the discharge spout 7 into the trough or troughs formed by the conveyor band and upstanding rails. As the upper run of the conveyor moves continuously through the oven 1, the dough will be baked so as to cause it to form a continuous ribbon or ribbons 28 of the baked product. At the discharge end of the upper run 15 the conveyor will pass around the turning roll 11, thereby stretching the trough-forming rails. Stretching of the rails will cause them to contract in width and height, but, because of their elastic character, they will not be damaged and will return to original shape when permitted to do so. The product ribbons separated by knife 28 will pass directly to the upper run 27 of the receiving conveyor 26 for subsequent cutting and packaging operations.

This disclosure is representative of preferred methods and apparatus, but is intended to be illustrative rather than definitive of the invention. The invention is defined in the claims.

I claim:
1. A bakery oven comprising apparatus including:
an elongate oven housing having heating elements therein for raising the interior of the oven to baking temperatures in the neighborhood of 500°F; and a conveyor construction therein, leading from one end thereof to the other, and comprising an endless metallic band trained about spaced apart turning rolls to provide a support surface extending between said rolls; a pair of endless, spaced apart, continuous parallel rails carried by and upstanding from said band to provide food product receiving trough means, each of said rails being formed of an elastic material which remains resilient at said baking temperatures; and an adhesive layer which will withstand said oven temperatures disposed between said rails and band, over the length of said rails, elastically bonding said rails to the band and sealing dough products within said trough means; and means for driving at least one of said rolls to move said band in an orbital path.

* * * * *